United States Patent
Carlén

(10) Patent No.: US 9,332,112 B2
(45) Date of Patent: May 3, 2016

(54) COMMUNICATIONS SYSTEM AND METHOD IN CONNECTION WITH VEHICLE

(71) Applicant: SCANIA CV AB, Södertälje (SE)

(72) Inventor: Andreas Carlén, Södertälje (SE)

(73) Assignee: SCANIA CV AB (SE)

( * ) Notice: Subject to any disclaimer, the term of this patent is extended or adjusted under 35 U.S.C. 154(b) by 0 days.

(21) Appl. No.: 14/439,762

(22) PCT Filed: Oct. 23, 2013

(86) PCT No.: PCT/SE2013/051234
§ 371 (c)(1),
(2) Date: Apr. 30, 2015

(87) PCT Pub. No.: WO2014/070076
PCT Pub. Date: May 8, 2014

(65) Prior Publication Data
US 2015/0304477 A1    Oct. 22, 2015

(30) Foreign Application Priority Data

Oct. 30, 2012 (SE) ....................... 1251216

(51) Int. Cl.
| | | |
|---|---|---|
| *H04M 3/00* | (2006.01) | |
| *H04M 1/725* | (2006.01) | |
| *G08C 17/00* | (2006.01) | |
| *B60R 25/04* | (2013.01) | |
| *G07C 9/00* | (2006.01) | |

(Continued)

(52) U.S. Cl.
CPC .............. *H04M 1/7253* (2013.01); *B60R 25/04* (2013.01); *B60R 25/24* (2013.01);
(Continued)

(58) Field of Classification Search
CPC ......... G07C 9/00309; H04M 1/72533; H04M 1/72519; H04M 1/72522

USPC ................ 455/420, 550.1, 556.1; 340/426.16
See application file for complete search history.

(56) References Cited

U.S. PATENT DOCUMENTS 7,420,467 B2 *  9/2008  Patenaude ............. B60R 25/102
                                                    340/426.18
7,599,715 B2 * 10/2009  Himmelstein ......... G06Q 10/10
                                                    340/426.19

(Continued)

FOREIGN PATENT DOCUMENTS

EP      2 048 627 A2    4/2009
WO      WO 00/72463 A2  11/2000

(Continued)

OTHER PUBLICATIONS

International Search Report dated Apr. 9, 2014 issued in corresponding International patent application No. PCT/SE2013/051234.

*Primary Examiner* — Danh Le
(74) *Attorney, Agent, or Firm* — Ostrolenk Faber LLP

(57) ABSTRACT

A communications system for use in connection with a vehicle (1): a mobile handheld communication device (2); a handheld vehicle activation device (4); a communication module (6) arranged on the vehicle and able to establish wireless communication to the communication device (2). The communication device (2) includes a tracking device (8) for wireless vehicle identifying information (10) from the vehicle activation device (4), where the vehicle identifying information (10) identifies a specific vehicle. The system identifies a vehicle based on the information, and establishes a wireless communications link (12) between the communication device (2) and the communication module (6) in the identified vehicle (1).

20 Claims, 2 Drawing Sheets

(51) Int. Cl.
*H04W 76/00* (2009.01)
*B60R 25/24* (2013.01)
*H04Q 9/00* (2006.01)
*H04W 8/00* (2009.01)
*H04W 4/00* (2009.01)
*H04W 4/04* (2009.01)
*H04L 29/08* (2006.01)
*H04W 84/18* (2009.01)

(52) U.S. Cl.
CPC ......... *G07C 9/00309* (2013.01); *G08C 17/00* (2013.01); *H04L 67/125* (2013.01); *H04Q 9/00* (2013.01); *H04W 4/008* (2013.01); *H04W 8/005* (2013.01); *H04W 76/00* (2013.01); *H04L 67/12* (2013.01); *H04Q 2209/40* (2013.01); *H04W 4/046* (2013.01); *H04W 84/18* (2013.01)

(56) References Cited

U.S. PATENT DOCUMENTS

| | | | | |
|---|---|---|---|---|
| 2007/0061069 A1* | 3/2007 | Christensen | ........... | G07C 5/008 701/1 |
| 2008/0294302 A1* | 11/2008 | Basir | ........... | G01C 21/20 701/2 |
| 2010/0233957 A1 | 9/2010 | Dobosz | | |
| 2010/0302974 A1* | 12/2010 | Niiyama | ........... | G07C 5/085 370/254 |
| 2011/0234379 A1 | 9/2011 | Lee | | |
| 2011/0237186 A1 | 9/2011 | Preissinger et al. | | |
| 2012/0142367 A1* | 6/2012 | Przybylski | ........... | H04W 4/046 455/456.1 |
| 2013/0090781 A1 | 4/2013 | Gellatly et al. | | |
| 2014/0022051 A1* | 1/2014 | Levien | ........... | A61M 5/20 340/5.2 |
| 2014/0236645 A1* | 8/2014 | Aaron | ........... | G06Q 10/02 705/5 |
| 2015/0296372 A1* | 10/2015 | Hieronymi | ........... | H04W 8/24 709/219 |
| 2015/0350413 A1* | 12/2015 | Ma | ........... | H04M 1/72577 455/418 |

FOREIGN PATENT DOCUMENTS

| | | |
|---|---|---|
| WO | WO 2011/047056 A1 | 4/2011 |
| WO | WO 2012/134571 A1 | 10/2012 |
| WO | WO 2013016581 A1 | 1/2013 |

* cited by examiner

COMMUNICATIONS SYSTEM AND METHOD IN CONNECTION WITH VEHICLE

CROSS-REFERENCE TO RELATED APPLICATIONS

The present application is a 35 U.S.C. §§371 national phase conversion of PCT/SE2013/051234, filed Oct. 23, 2013, which claims priority of Swedish Patent Application No. 1251216-6, filed Oct. 30, 2012, the contents of which are incorporated by reference herein. The PCT International Application was published in the English language.

FIELD OF THE INVENTION

The present invention pertains to a communications system and a method for communicating from a communication device to a vehicle.

BACKGROUND OF THE INVENTION

It is increasingly common to connect some form of mobile handheld device, for example a so-called smartphone, to a vehicle in order to e.g. start/stop different functions in the vehicle (e.g. a heater), to activate/deactivate the vehicle alarm, to lock/unlock the vehicle and to control the status for different functions in the vehicle and also to adjust e.g. the driver's seat, the steering wheel and the rear-view mirrors according to the given driver's personal preferences. The device is normally connected to a vehicle by a person who owns or usually drives it.

In connection with the pairing (i.e. the establishment of the connection) with the vehicle, often some form of input is required to the mobile device in order to correctly identify the vehicle, where the input may comprise the vehicle's chassis number or another identity. Further, the driver may be required to identify himself by inserting a PIN code. Communication is via a mobile network, for example the 3G network, and entails for example that the information is verified by a server belonging to the vehicle manufacturer. The vehicle comprises necessary communications equipment in order to establish the communication with the handheld device and also to initiate the measures which the user of the handheld device inserts or which are automatically generated in connection with the establishment of the connection.

There are examples of wireless control of connection of different functions for a vehicle, and a number of these are discussed briefly below.

US-20100233957 describes how near field communication (NFC) may be used to transmit data from a mobile telephone to a car. The information transmitted is personal data, so that the car is adjusted according to personal requirements. The document describes how the steering wheel, the drivers seat and the rear-view mirrors, etc. may be adjusted.

US-20110234379 describes a system which may automatically send information between a mobile telephone and another device. Also in this case, near field communication is used.

US-20110237186 describes a system which is able to send information between e.g. a mobile telephone and a vehicle.

These documents essentially describe how to use near field communication (NFC) to transmit some form of data between e.g. a mobile telephone and a vehicle.

In the case of a larger vehicle fleet with more than one or a couple of vehicles, it may sometimes be difficult to know to which vehicle to connect the mobile handheld device. There is a risk of connecting it to the wrong vehicle or not knowing to which vehicle to connect the device.

Also, the input of a vehicle's identification data may be time-consuming and complicated, especially if there is a large number of vehicles to choose from, since you need to know the specific vehicle's identification data.

In order for it to be useful to use a mobile handheld devices connected to a random vehicle in a vehicle fleet, the identification of different individual vehicles and the connection must be simple and secure to complete, so that a successful connection to the correct individual vehicle is always achieved.

The objective of the present invention is to achieve a simplified pairing and connection with a given vehicle, without having to insert vehicle-related identification data in the handheld device.

SUMMARY OF THE INVENTION

Generally, the present invention pertains to an automatic identification of a vehicle for connection with a mobile handheld device, for example a mobile telephone.

According to one embodiment, the vehicle identifying information is accessed from a vehicle actuation device with radio communication, e.g. near field communication (NFC).

According to another embodiment, the vehicle identifying information is accessed from the vehicle activation device through optical tracking.

By applying the invention, it makes it very easy to connect a mobile handheld device to the correct vehicle. With e.g. a vehicle application in a smartphone you only need to swipe the mobile phone over the correct vehicle key in order for the application to know which vehicle it should connect to. This means it is possible in a simple way to use the potential of smartphone devices and to offer the possibility of simply and securely connecting to a vehicle.

DETAILED DESCRIPTION OF PREFERRED EMBODIMENTS OF THE INVENTION

The invention is described in detail below with reference to the enclosed figures.

Figure 1:
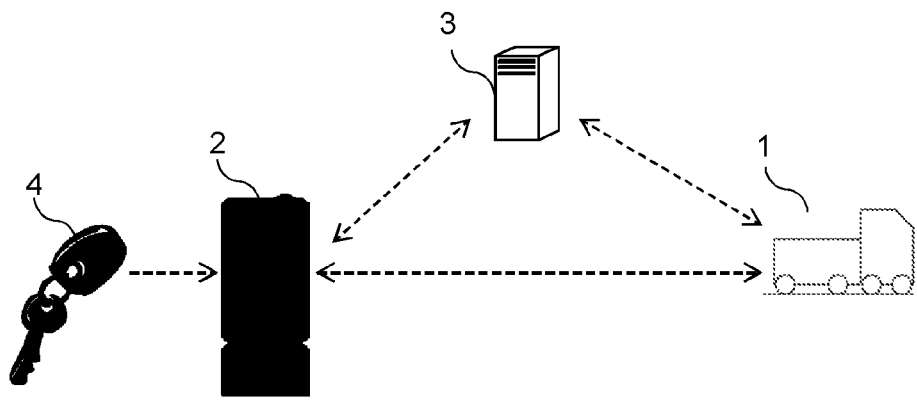
FIG. 1 is a schematic image which illustrates the present invention.

FIG. 1 shows a schematic image which illustrates one embodiment of the invention. The driver has a handheld vehicle activation device 4, for example a vehicle key to a vehicle 1, which may be accessed by a handheld communication device 2, for example a mobile telephone. When the vehicle to which the vehicle activation device fits has been identified by the communication device, for example verification via a data storage server 3, a wireless, preferably two-way, communications link between the communication device and a communication module in the vehicle may be established. Thus, a number of functions in the vehicle may be activated and controlled by feeding control instructions via the communication device.

Figure 2:
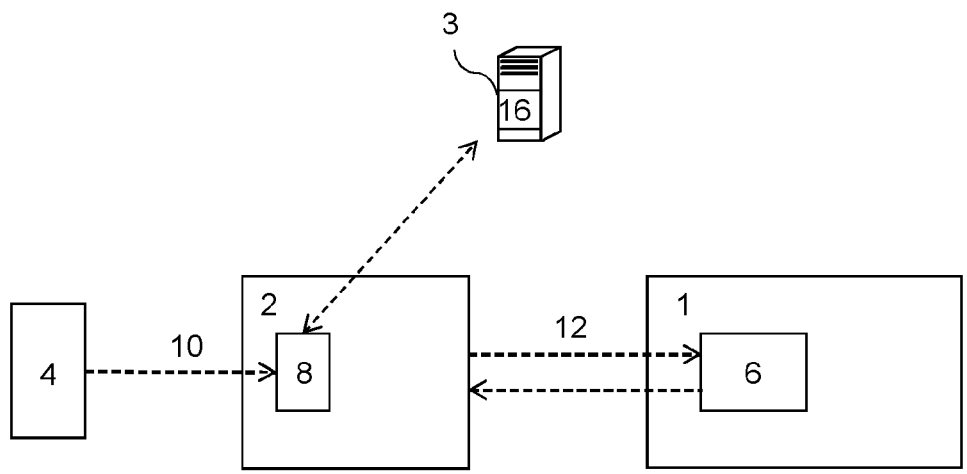
FIG. 2 is a schematic block diagram which illustrates the communications system according to one embodiment of the present invention.
Figure 3:
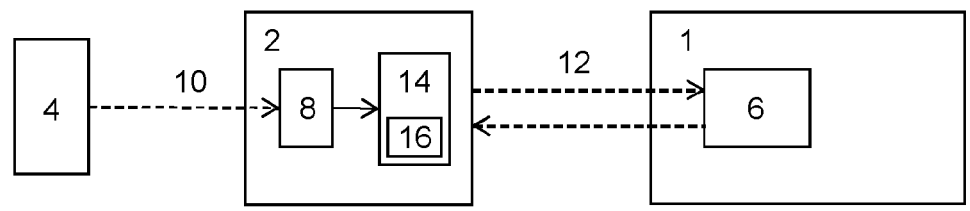
FIG. 3 is a schematic block diagram which illustrates the communications system according to another embodiment of the present invention.
Figure 4:
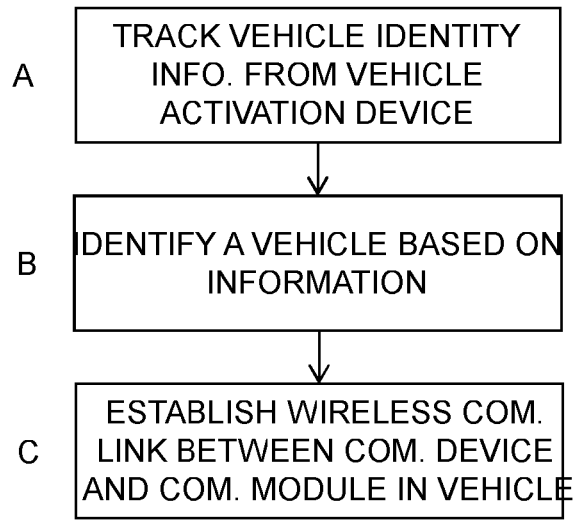
FIG. 4 is a flow diagram which illustrates the method according to the present invention.
Figure 5:
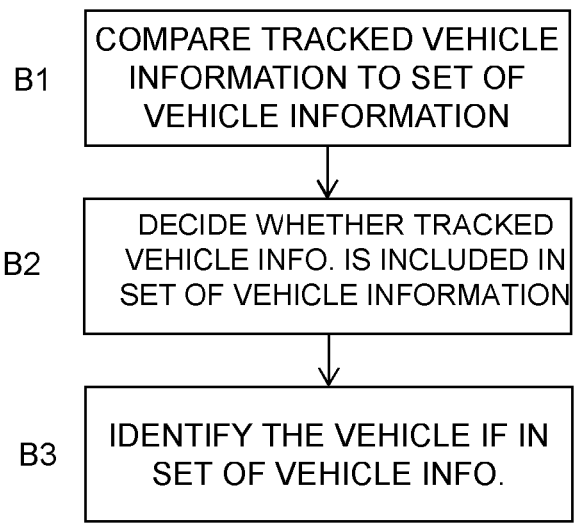
FIG. 5 is a flow diagram which illustrates an embodiment of the method according to the invention.

FIGS. 2 and 3 show block diagrams which schematically illustrate the communications system according to two embodiments of the present invention.

The invention thus pertains to a communications system in connection with a vehicle 1, comprising a mobile handheld communication device 2, preferably a mobile telephone, for example a so-called smartphone, and a handheld vehicle activation device 4, preferably a vehicle key, comprising vehicle identifying information, i.e. information which unambiguously identifies the vehicle to which the vehicle activation device 4 belongs. The communications system also comprises a communication module 6 arranged on the vehicle and adapted to establish wireless, preferably two-way, communication to said communication device 2 directly or via the vehicle manufacturer's data storage server 3 (see FIG. 1 or 2).

The communication device 2 comprises a tracking device 8 adapted to wireless tracking of vehicle identifying information 10 from the vehicle activation device 4. The vehicle identifying information 10 unambiguously identifies a specific vehicle and may, for example, comprise the vehicle's chassis number, registration number or other identifying information.

The communications system is adapted to identify a vehicle based on the vehicle identifying information 10, and to establish a wireless communications link 12 between the communication device 2 and the communication module 6 in the identified vehicle 1.

According to one embodiment of the communications system, the tracked vehicle identifying information 10 is compared with a set of vehicle identifying information 16 relating to one or several vehicles. The objective is to identify the vehicle identified by the tracked vehicle identifying information in this set. The set of vehicle identifying information may, for example, comprise information regarding several vehicles belonging to the same haulage firm. For example, the information may comprise similar information as the information tracked from the vehicle activation device, i.e. for example chassis number or registration number, so that the comparison is easy to carry out.

According to one embodiment, the set of vehicle identifying information 16 is available on a data storage server 3 (see FIG. 2) with which the communication device is adapted to communicate. This may be a server held by e.g. the vehicle manufacturer.

According to another embodiment of the communications system, the communication device 2 comprises a memory device 14 comprising a set of vehicle identifying information 16 relating to one or several vehicles. The tracked vehicle identifying information 10 is compared to the set of vehicle identifying information 16 in order to identify the vehicle identified by the tracked vehicle identifying information 10 in this set. The set of vehicle identifying information 16 may, for example, comprise information regarding several vehicles belonging to the same haulage firm.

In connection with data which is stored for each vehicle included in the set of vehicle identifying information, there is specific information relating to the specific vehicle and also, preferably, to the driver. This may relate to special settings for the driver seat, rear-view mirrors, heating/cooling, etc.

According to one embodiment of the invention, the vehicle identifying information is tracked from a vehicle actuation device with radio communication, and preferably near field communication (NFC).

This method entails that the vehicle identity is tracked via near field communication from the mobile handheld communication device from the vehicle activation device, such as the vehicle's key or equivalent which is equipped with an NFC information carrier, often called an NFC tag. The technology requires that the communication device actively generates a radio frequency field which may energize the passive NFC information carrier in the vehicle activation device. This makes it possible to make the NFC information carrier very simple and it may therefore be arranged in e.g. vehicle keys, access cards, etc. The information on the NFC information carrier may typically only be read, but with specific instructions the information may also be amended.

Since the range of this communication is limited to a few centimeters, it is therefore necessary to have the key or similar item at hand during identification. This ensures that a connection is made with the correct individual vehicle, and that it is easy to connect to several different vehicles as long as you have access to the correct key.

According to another embodiment, the tracking of the vehicle identifying information is carried out via optical tracking.

This embodiment entails that via optical identification with the mobile handheld communication device, the vehicle identity stored in the form of a one- or two-dimensional bar code (for example a so-called EAN code or QR code), or similar, is tracked from the vehicle activation device, i.e. the vehicle's key or similar. This method also ensures that a connection is made with the correct individual vehicle, and that it is easy to connect to several different vehicles as long as you have access to the correct bar code or similar.

According to yet another embodiment, the tracking of the vehicle identifying information is carried out via magnetic tracking.

In the wireless communications link, which is established between the communication device and the communication module in the vehicle, communication takes place preferably according to an established mobile telephone standard. In FIGS. 1 and 2, the communications link 12 has been indicated so that it passes via the vehicle manufacturer's server or directly between the devices after having been verified via the vehicle manufacturer's server. This normally occurs via a mobile telephone network (mobile data network) and/or wireless network (WLAN). The communication is preferably IP-based and uses mobile data only, or consists of a combination of mobile data and a wireless network (WLAN).

Once the wireless communications link has been established, it is adapted to transmit control instructions from the communication device to said communication module in order to impact various functions for the vehicle, but also in order to be able to receive e.g. status information from the vehicle.

The present invention also pertains to a method in connection with a vehicle, which method is described below with reference to the flow chart in FIG. 3. As described above, the vehicle comprises a communication module adapted to establish wireless communication to an intelligent mobile handheld communication device, where the handheld device comprises a tracking device adapted to track vehicle identifying information from a handheld vehicle activation device, and the vehicle identifying information unambiguously identifies a specific vehicle.

The method according to the invention comprises the steps to:

A—track vehicle identifying information from said vehicle activation device,

B—identify a vehicle based on said information,

C—establish a wireless communications link between said communication device and the communication module in the identified vehicle.

According to one embodiment the step B comprises the steps to:

B1—compare said tracked vehicle identifying information with a set of vehicle identifying information relating to one or several vehicles;

B2—decide whether the tracked vehicle identifying information is included in said set, and B3—identify the vehicle if the vehicle identifying information is included in said set.

The communications system intended to implement the method has been described in detail in connection with the above description and will therefore not be described here, but instead reference is made to the above description.

The invention also comprises a computer program product comprising instructions intended to implement the method described above.

Preferably, the computer program product is a so-called application program adapted to be installed in the communication device. The application program comprises instructions to generate an input menu for display on a screen in the communication device and where instructions are shown to the user. Examples of instructions include tracking vehicle identifying information from the vehicle activation device and feeding control instructions to the vehicle when a communications link to the vehicle has been established.

The present invention is not limited to the preferred embodiments described above. Various alternatives, modifications and equivalents may be used. The embodiments above shall therefore not be deemed to limit the scope of the invention, which is defined by the enclosed patent claims.

The invention claimed is:

1. A communications system in connection with a vehicle, comprising:
   a mobile handheld communication device;
   a handheld vehicle activation device;
   a communication module arranged on the vehicle and configured to establish wireless communication with the communication device,
   the communication device comprises a tracking device configured to wirelessly track vehicle identifying information from the vehicle activation device, wherein the vehicle identifying information identifies a specific vehicle, and
   the system is configured to identify a vehicle based on the vehicle identifying information, and to establish a wireless communications link between the communication device and the communication module in the identified vehicle;
   the tracked vehicle identifying information is configured to be compared to a set of vehicle identifying information relating to one or to several vehicles for identifying the vehicle identified by the tracked vehicle identifying information in the set.

2. The communications system according to claim 1, wherein the communications system further comprises:
   a data storage server configured to wirelessly communicate with the communication device, and
   the set of vehicle identifying information is stored on the data storage server, wherein the comparison is made on the data storage server.

3. The communications system according to claim 1, wherein the communication device comprises a memory device comprising the set of vehicle identifying information relating to one or several vehicles, and wherein the tracked vehicle identifying information is configured to compare the set of vehicle identifying information of the memory device in order to identify the vehicle identified by the tracked vehicle identifying information in the set.

4. The communications system according to claim 1, wherein the mobile communication device is a mobile telephone.

5. The communications system according to claim 1, wherein the vehicle activation device is a vehicle key.

6. The communications system according to claim 1, wherein the tracking of the vehicle identifying information is done via radio communication.

7. The communications system according to claim 6, wherein the tracking of vehicle identifying information is done via near field communication (NFC).

8. The communications system according to claim 1, wherein the tracking of vehicle identifying information is done by optical tracking.

9. The communications system according to claim 1, wherein the tracking of vehicle identifying information is done by magnetic tracking.

10. The communications system according to claim 1, wherein the wireless communications link is configured to communicate according to an established mobile telephone standard.

11. The communications system according to claim 1, wherein the wireless communications link is configured to transmit control instructions from the communication device to the communication module.

12. A method for identifying a vehicle, wherein
   the vehicle comprises:
   a communication module configured to establish wireless communication to an intelligent mobile handheld communication device, wherein the handheld device comprises a tracking device configured to track vehicle identifying information from a handheld vehicle activation device, wherein the vehicle identifying information identifies a specific vehicle,
   the method comprises the steps to:
   A—track vehicle identifying information from the vehicle activation device,
   B—identify a vehicle based on the information, wherein the identifying comprises the steps to:
   B1—compare the said tracked vehicle identifying information with a set of vehicle identifying information relating to one or several vehicles;
   B2—decide whether the tracked vehicle identifying information is included in the set, and
   B3—identify the vehicle if the vehicle identifying information is included in the set, and
   C—establish a wireless communications link between the communication device and the communication module in the identified vehicle.

13. A method according to claim 12, wherein the mobile communication device is a mobile telephone.

14. A method according to claim 12, wherein the vehicle activation device is a vehicle key.

15. A method according to claim 12, wherein the tracking of vehicle identifying information is done via radio communication.

16. A method according to claim 15, wherein the tracking of vehicle identifying information is done via near field communication (NFC).

17. A method according to claim 12, wherein the tracking of vehicle identifying information is done by optical tracking.

18. A method according to claim 12, wherein the tracking of vehicle identifying information is done by magnetic tracking.

19. A method according to claim 12, wherein the wireless communications link communicates according to an established mobile telephone standard.

20. A method according to claim 12, wherein the wireless communications link is configured to transmit control instructions from the communication device to the communication module.

* * * * *